Nov. 9, 1926.  1,606,425
C. F. JOHANSON
SLED
Filed April 8, 1925    2 Sheets-Sheet 1
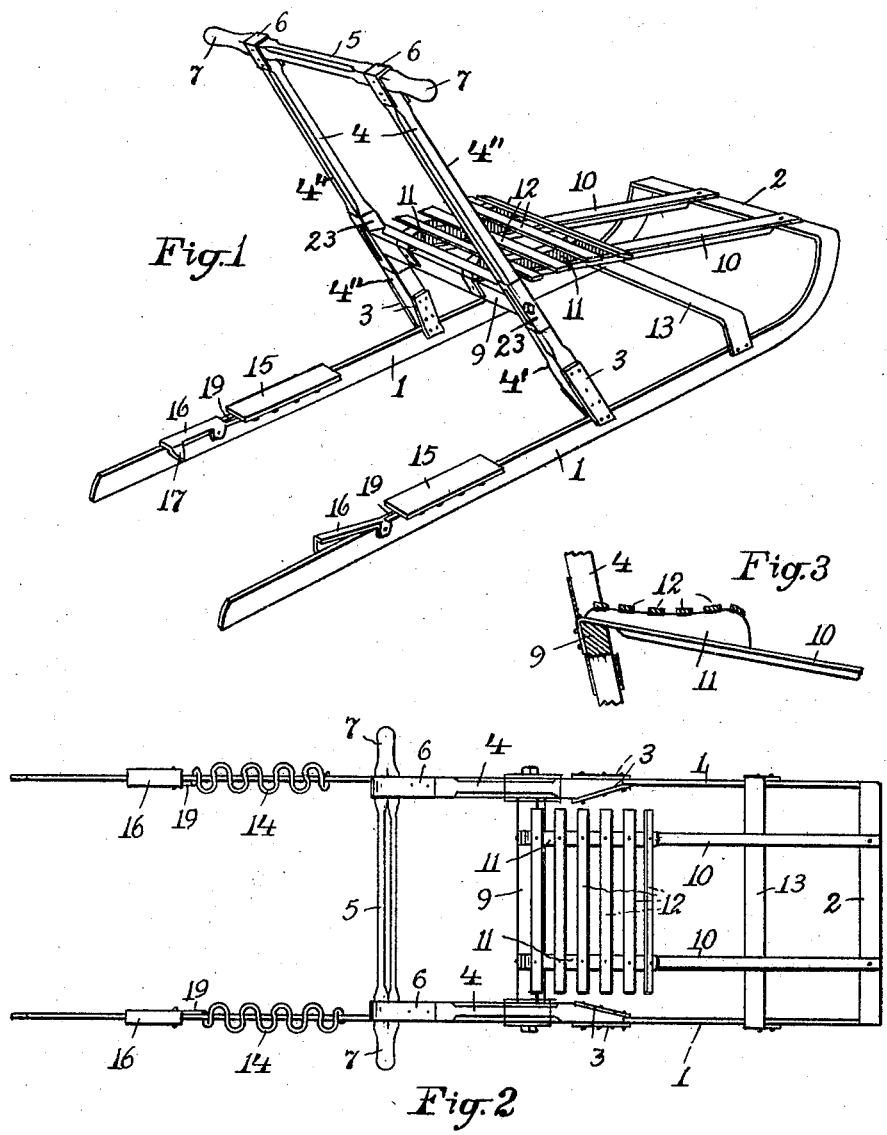
INVENTOR.
Curth F. Johanson;
BY
A. B. Upham,
ATTORNEY.

Nov. 9, 1926.  1,606,425
C. F. JOHANSON
SLED
Filed April 8, 1925   2 Sheets-Sheet 2
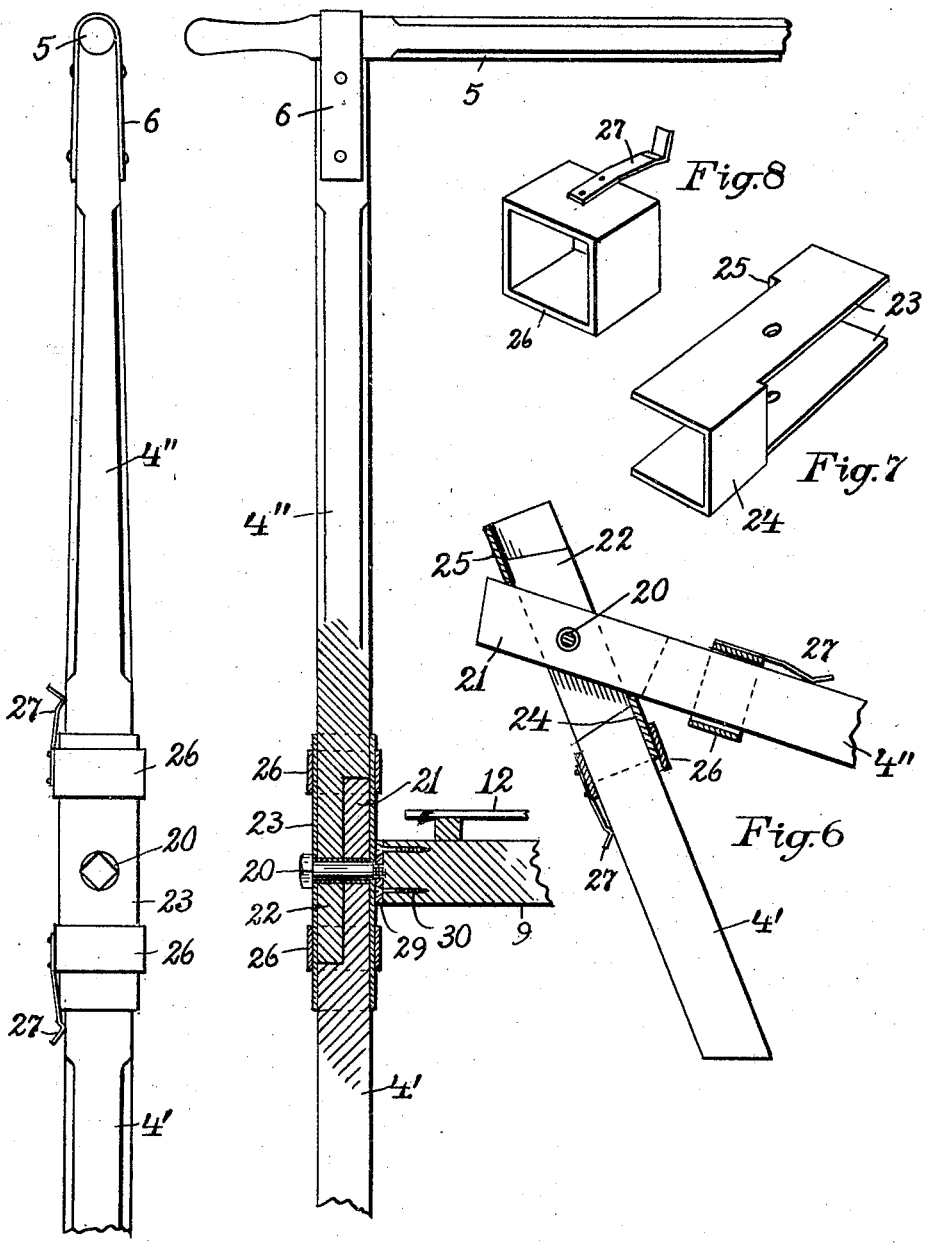
INVENTOR.
Curth F. Johanson;
BY
A. B. Upham,
ATTORNEY.

Patented Nov. 9, 1926.

1,606,425

UNITED STATES PATENT OFFICE.

CURTH F. JOHANSON, OF ARLINGTON, MASSACHUSETTS, ASSIGNOR OF ONE-HALF TO JOHN P. SHERDEN, OF ARLINGTON, MASSACHUSETTS.

SLED.

Application filed April 8, 1925. Serial No. 21,549.

This invention relates to sleds especially designed for high speed upon the ice or upon the frozen crust of the snow, and which are provided with upwardly extending handles disposed for being grasped by the person who propels the sled by resting one foot upon one of the runners and pushing against the ice or snow with his other foot; and the object of this invention is the perfecting of the various details of construction as hereinafter set forth.

In the drawings forming part of this specification, Fig. 1 is a perspective view of the sled. Fig. 2 is a plan view of the same. Fig. 3 is a detail view of the seat. Fig. 4 is a side view of one of the handles. Fig. 5 is a partially sectional view of the same. Fig. 6 shows the handle flexed. Fig. 7 is a perspective view of a pivot-member. Fig. 8 is a perspective view of one of the clamps.

The runners 1 are preferably of spring steel, supported edge down, and made integral by a cross-member 2 bent across their up-turned ends. Attached to each runner is an oblique bar 4 secured thereto by straps 3 preferably riveted to each part; and upon the upper ends of the handle-bars 4 is fastened a bar 5 by means of straps 6, its ends projecting beyond the parts 4 to form handles 7.

Spaced a suitable distance above the runners 1 is a cross bar 9, to which and to the cross-member 2 are attached the ends of two T-irons 10, each of whose vertical web is beneath. Upon the rear portions of these T-irons 10 are fastened blocks 11, suitably curved upon their upper edges and made higher at their front ends than they are farther back, as illustrated in Fig. 3. Slats 12 are nailed upon these blocks 11 to form a seat for the occupant of the sled, a foot rest 13 being provided for those of limited stature.

A short distance behind each bar 4 there is a foot-rest preferably composed of a serpentine rod 14 having its ends fastened in holes in the runner thereat, as shown in Fig. 2, and having a rubber tread 15 secured upon it, as indicated in Fig. 1.

Immediately behind each foot-rest is a brake 16 pivoted to the runner 1 and having a hook 17 at its rear end, this hook being normally held up and out of contact with the ice by a finger 19 reaching beneath the rubber tread 15.

This racer sled is used in the following manner; a person being seated upon the slats 12 with his feet upon the cross-bar 13 or the cross-portion 2, the youth to run the sled places one foot upon the foot-rest 15 at one side, grasping the handle-bar 5 with both hands, and with his other foot he propels the sled rapidly along. When one foot gets tired, he reverses to the other foot upon the foot-rest and so continues the journey. If he is upon an icy road and going down hill, he places both feet upon the foot-rest and lets gravitation do the rest.

For steering the sled, he merely presses one bar 4 away and pulls upon the other, and thereby so flexes the runners as to vary the direction of travel at will.

For marketing, if no passenger is to be carried, the basket or bundle can be strapped upon the seat and the T-irons. If no bundles are to be carried, and the person is alone, he can, when coming to a down-hill, sit upon the seat and steer by the pressure of his feet upon the cross bar 13 or the cross-portion 2.

When the person operating this sled by pushing, wishes to stop or slow down, he puts his heel upon one or both of the brakes 16, thereby digging the hook or hooks into the ice and controlling progress at will.

To enable this sled to be packed into a small compass I prefer to form the handle-bars 4 in two parts pivotally united at 20 in line with the cross-bar 9, as shown in Fig. 5. The two bar-sections 4' and 4'' are each narrowed where they overlap, in order that the combined thickness may not exceed their individual thickness; the bolt 20 passing through these narrowed portions 21, 22. The bar portion 4' is provided with protecting and strengthening shield 23 rising a short distance above it, and consisting of two opposing sides 23, a cross portion 24 at the lower front end, and a cross portion 25 at the upper rear end, the bolt 20 penetrating the sides 23. At each end of the shield 23 is a collar 26 slidable thereon and having a spring detent 27 for retaining the same in place.

Both collars 26 having been slid away from the medial portion of the shield 23 and out of engagement with the parts 21, 22, of both bars 4, the upper portions 4″ can be swung forward and down upon the T-irons 10; thereby reducing the dimensions of the sled to proportions suitable for transportation or storage. By swinging the parts 4″ up into line with the parts 4′ and sliding the collars toward the bolt 20, the sled is ready for use.

I prefer to attach a metal plate 29 to each end of the bar 9, as by screws 30, and tap the inner ends of the bolt 20 into the plate.

What I claim as my invention is:

1. In a sled having runners, foldable steering handles therefor comprising two pivotally united sections, a cross bar uniting the lower two members of said sections, connection between said cross bar and the front ends of said runners, and slidable sleeves for holding said steering handle sections rigidly together.

2. In a sled having runners, foldable steering handles therefor each of which is in two sections, a cross bar uniting the upper ends of the two lower sections, connection between said cross bar and the front ends of said runners, the two sections of each steering handle being thinned and overlapped, a bolt penetrating said thinned portions, a strenghtening shield enclosing the thinned portions, and means for rendering the two sections of each handle inflexible.

In testimony that I claim the foregoing invention, I have hereunto set my hand this 30th day of March, 1925.

CURTH F. JOHANSON.